(12) United States Patent
Lee et al.

(10) Patent No.: US 7,293,973 B2
(45) Date of Patent: Nov. 13, 2007

(54) APPARATUS AND METHOD OF FABRICATING LIGHT GUIDE PANEL

(75) Inventors: Hong Su Lee, Kumi-shi (KR); Jae Ho Hwang, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 631 days.

(21) Appl. No.: 10/742,803

(22) Filed: Dec. 23, 2003

(65) Prior Publication Data

US 2004/0178524 A1 Sep. 16, 2004

(30) Foreign Application Priority Data

Mar. 13, 2003 (KR) .................. 10-2003-0015673
Mar. 13, 2003 (KR) .................. 10-2003-0015674

(51) Int. Cl.
*B29D 11/00* (2006.01)
(52) U.S. Cl. .................................. 425/192 R
(58) Field of Classification Search ............... 425/190, 425/192 R; 264/1.24
See application file for complete search history.

(56) References Cited

U.S. PATENT DOCUMENTS 6,663,800 B1 * 12/2003 Lee et al. .................. 264/1.24
2002/0181224 A1 * 12/2002 Tahara et al. .................. 362/31

FOREIGN PATENT DOCUMENTS

KR 313246 B * 11/2001

* cited by examiner

*Primary Examiner*—Robert Davis
*Assistant Examiner*—Marissa W Chaet
(74) *Attorney, Agent, or Firm*—McKenna Long & Aldridge LLP

(57) ABSTRACT

An apparatus and method for fabricating the light guide panel reduces the thickness of the stamper and fixes it firmly in place. The apparatus and method for fabricating the light guide panel according to the present invention has a stamper for forming patterns on the light guide panel and first and second side mold frames which are separable so as to hold the stamper in place during the formation of the light guide and so as to easily eject the finished light guide after it has formed and hardened.

6 Claims, 17 Drawing Sheets

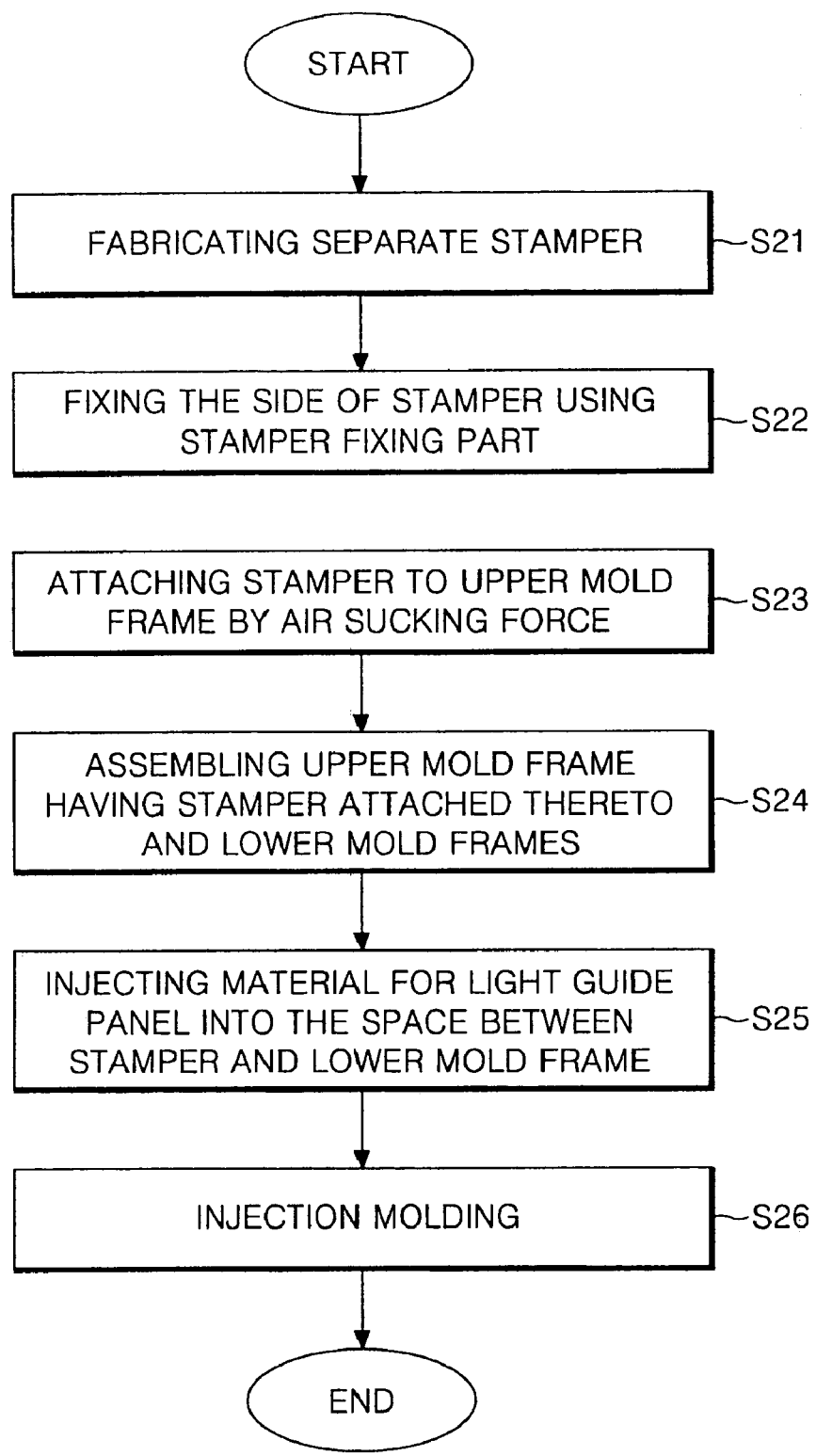

APPARATUS AND METHOD OF FABRICATING LIGHT GUIDE PANEL

This application claims the benefit of Korean Patent Application Nos. 10-2003-0015673 and 10-2003-0015674 filed in Korea on Mar. 13, 2003, which are hereby incorporated by reference for all purposes as if fully set forth herein.

BACKGROUND OF THE INVENTION

1. Field of the Invention

The present invention relates to an apparatus and a method for fabricating a light guide panel of a liquid crystal display, and more particularly to an apparatus and a method for fabricating a light guide panel which are capable of reducing the thickness of a stamper and of firmly fixing the stamper.

2. Description of the Related Art

In general, a liquid crystal display (hereinafter referred to as "LCD") displays pictures on a screen by controlling the transmittance of light beams supplied from a back light unit. The controlling function is performed by a liquid crystal display panel that has a plurality of liquid crystal cells arranged in a matrix and a plurality of control switches for switching video signals to be supplied to each liquid crystal cell.

FIG. 1 illustrates the structure of a related art back light unit for use in a conventional LCD. Referring to FIG. 1, the related art back light unit includes: a lamp 10 for generating light beams; a lamp housing 14 for accommodating the lamp 10; a light guide panel 12 for transforming the light beams incident from the lamp 10 into a surface light source; optical sheets 18, 20, 22, and 24 attached on the light guide panel 12 and for increasing the efficiency of light incident to a liquid crystal display panel (not shown); and a reflection plate 16 which is placed under the light guide panel 12 and reflects the light beams coming from the rear surface of the light guide panel 12 toward the liquid crystal display panel. Also, the liquid crystal display panel is placed above the back light unit and displays pictures on a screen by controlling the transmittance of light beams supplied from the back light unit.

The lamp 10 is commonly a cold cathode fluorescent lamp. The light beams generated by the lamp 10 reach the light guide panel via the incident surface present at one side of the light guide panel.

The lamp housing 14 is installed to accommodate the lamp 10, and has inner reflecting surfaces to reflect the light from the lamp 10 toward the incident surface of the light guide panel 12.

The light guide panel 12 transforms the light beams incident from the lamp 10 into a surface light source. This light guide panel 12 has a sloped rear surface and a planar exit surface, and is fabricated so as to make the incident surface perpendicular to the exit surface. The reflection plate 16 is placed under the light guide panel 12 so as to face the rear surface thereof. The light guide panel 12 causes the lights incident from the lamp 10 to reach regions far from the lamp 10. The light guide panel 12 is generally fabricated from polymethylmethacrylate (PMMA), which has high degree of strength so that it cannot be easily deformed or broken, and which has a high transmittance of light.

The reflection plate 16 re-reflects the light incident through the rear surface of the light guide panel 12 toward the light guide panel 12, and reduces the loss of light. When the light from the lamp 10 comes to the light guide panel 12, it is reflected at an angle of reflection by the sloped rear surface and is directed toward the exit surface. Here, the light coming to the rear surface and sides of the light guide panel 12 are reflected by the reflection plate 16 and then go toward the exit surface. The diffusion sheet 18 diffuses the light beams coming via the exit surface of the light guide panel 12 over the entire space of the back light unit.

On the other hand, the efficiency of light becomes high when the light incident to the liquid crystal display panel is perpendicular thereto. To do this, two prism sheets 20 and 22 are stacked to make the light coming from the light guide panel 12 go toward the liquid crystal display panel at a incident angle of 90-degrees. The first and second prism sheets 20 and 22 are shaped in a plurality of prism bars having hills and valleys. The two prism sheets 20 and 22 collect the light beams coming from the diffusion sheet 18 and cause them to go toward a screen with a right angle incident angle.

A protection film 24 is used to protect the surface of the second prism sheet 22, and also to diffuse the light to make its distribution uniform.

On the other hand, in order to enhance the lighting efficiency the light guide panel 12 has patterns on at least one of the rear surface and the exit surface. Fabricating apparatuses illustrated in FIGS. 2 to 4 are used to form these patterns on the light guide panel 12.

The apparatus for fabricating the light guide panel illustrated in FIG. 2 includes: an upper mold frame 32 for forming patterns on the exit surface of the light guide panel 12; a side mold frame 40; a lower mold frame 34 for forming patterns on the rear surface of the light guide panel 12, wherein the upper, side, and lower mold frames 32, 40 and 34 together form a set of injection molding frames; and a first and a second fixing parts 36 and 38 for fixing externally the upper, side, and lower mold frames 32, 40, and 34. Light guiding patterns (not shown) for enhancing the optical performance of the light guide panel 12 are formed on at least one of the upper and lower mold frames 32 and 34. These light guiding patterns are directly formed on at least one of the upper and lower mold frames 32 and 34 through a cutting or corrosion process. However, there is a problem that the light guiding patterns that are formed on at least one of the upper and lower mold frames 32 and 34 are not uniform. Also, there is another problem wherein when making the light guide panel, the fabrication of the upper and lower mold frames and the formation of the light guiding patterns requires several days. To solve these problems, the fabricating apparatus illustrated in FIG. 3 is used.

The fabricating apparatus illustrated in FIG. 3 includes: a stamper 46 attached to the upper mold frame 32 to form radiating patterns on the exit surface of the light guide panel 12; an air induction pipe for attaching the stamper 46 to the upper mold frame 46 using air suction force; and a stamper fixing piece 42 located at one side of the upper mold frame 32 for determining the position of the stamper 46. The stamper 46 has light guiding patterns (not shown) formed thereon that define the radiating patterns on the exit surface of the light guide panel. The lower mold frame 34 has light guiding patterns (not shown) formed thereon that define rear patterns on the rear surface of the light guide panel through the cutting or corrosion process. While the fabricating apparatus for the light guide panel using this stamper 46 makes it possible to reduce the fabrication time for the light guide panel by attaching the stamper 46 to the upper mold frame 32, there is a problem that the stamper 46 cannot be assembled with the lower mold frame 34. If the stamper is to be assembled with the lower mold frame 34, an additional air induction pipe 44 for fixing the stamper 46 results in a more complex fabricating apparatus for the light guide panel. To solve these problems, the fabricating apparatus for the light guide panel illustrated in FIG. 4 is used.

The fabricating apparatus for the light guide panel illustrated in FIG. 4 includes a lower stamper 28 coupled with the lower mold frame 34 through screws 48. The lower stamper 28 and an upper stamper 46 attached to the upper mold frame 32 have the light guiding patterns for defining the rear patterns and radiating patterns respectively on the light guide panel. To be coupled with the lower mold frame 34 without the air induction pipe, the lower stamper 28 is fixed through screws 48 and formed having a thickness in the range 4-8 mm.

To be fixed without the air induction pipe, the lower stamper 28 of the fabricating apparatus illustrated in FIG. 4 is formed to be relatively thick. In this case, there are problems in that it is difficult to make the lower stamper 28 thin, requiring a longer fabricating time to form the light guiding patterns of the lower stamper 28.

SUMMARY OF THE INVENTION

Accrodingly, the present invention is directed to an apparatus and method of fabricating a light guide panel that substantially obviates one or more of the problems due to the limitations and disadvantages of the related art.

Accordingly, an advantage of the present invention is to provide an apparatus and a method for fabricating light guide panel that are capable of reducing the thickness of a stamper.

Another advantage of the present invention is to provide an apparatus and a method for fabricating light guide panel that are capable of fixing stably the stamper.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, an apparatus for fabricating a light guide panel according to the present invention comprises: a stamper for forming patterns of the light guide panel; and a first and second side mold frames which are formed separable so as to hold the stamper therebetween.

The apparatus for fabricating a light guide panel further comprises: a screw groove penetrating the first side mold frame, the stamper, and a portion of the second side mold frame; and a screw inserted to the screw groove to couple the first side mold frame, the stamper, and the second side mold frame.

The stamper is formed to have a thickness in the range 0.3-1 mm.

The stamper has light guiding patterns for determining the rear surface patterns of the light guide panel.

The apparatus for fabricating a light guide panel further comprises: a first mold frame present between the first and second side mold frames and to which the stamper is to be attached; a first fixing part externally fixing the first mold frame, and the first and second side mold frames; a second stamper for determining patterns on the exit surface of the light guide panel; a second mold frame to which the second stamper is attached; and a second fixing part for externally fixing the second mold frame.

The light guiding patterns are formed so as to overlap with the first mold frame.

The second stamper is attached to the second mold frame using an air induction pipe.

In order to achieve these advantages of the invention, an apparatus for fabricating a light guide panel according to the present invention comprises: a stamper having designated patterns for determining the patterns of the light guide panel; and a side mold frame having a bent part, in order to fix the stamper, contacting with the non-patterned region of the stamper.

The apparatus for fabricating a light guide panel further comprises: a screw groove penetrating the side mold frame; and a screw inserted to the screw groove to couple the side mold frame.

The stamper is formed to have a thickness in the range 0.3~1 mm.

In order to achieve the advantages of the invention, an apparatus for fabricating a light guide panel according to the present invention comprises: a stamper for forming patterns of the light guide panel; a first mold frame having air induction holes which are formed on the surface contacting with the stamper along the outline of the stamper; and an air induction pipe connected with the air induction holes and for fixing the stamper by using air suction force.

The stamper has radiating patterns corresponding to the patterns on the exit surface of the light guide panel.

The apparatus for fabricating a light guide panel further comprises: a stamper fixing part for fixing one side of the stamper to the first mold frame; a second mold frame having rear surface patterns corresponding to the bottom surface patterns of the light guide panel; a first fixing part for externally fixing the first mold frame; a second fixing part for externally fixing the second mold frame; and an injection pipe for injecting material for the light guide panel into the space arranged between the stamper and the second mold frame.

The injection pipe is formed so as to penetrate the first fixing part and the stamper fixing part.

The air induction pipe is formed to penetrate the first mold frame and the first fixing part so as to be connected with the air induction holes.

The distance between the border of the second mold frame and the border of the air induction hole is in between about 0 and about 3 mm.

The stamper is formed to have a thickness thereof of between about 0.3 and about 1 mm.

In order to achieve these advantages of the invention, a method for fabricating a light guide panel according to the present invention comprises steps of: forming a first stamper for forming patterns of the light guide panel; fixing the first stamper to a lower mold frame by using a first and second side mold frames, which are formed separable so as to hold the first stamper therebetween; assembling together the lower mold frame having the first stamper fixed thereto and the upper mold frame having a second stamper fixed thereto; and forming the light guide panel by injecting material for the light guide panel into a space arranged between the upper and lower mold frames.

The step of fixing the first stamper to a lower mold frame by using a first and second side mold frames is a step of inserting a screw into a screw groove penetrating the first side mold frame, the first stamper, and a portion of the second mold frame.

In order to achieve these advantages of the invention, a method for fabricating a light guide panel according to the present invention comprises steps of: forming a first stamper for determining patterns of the light guide panel; fixing the first stamper to a lower mold frame by using a side mold frame having a bent part; assembling together the lower mold frame having the first stamper fixed thereto and an upper mold frame having a second stamper fixed thereto; and forming the light guide panel by injecting material for the light guide panel into a space arranged between the upper and lower mold frames.

In order to achieve these advantages of the invention, a method for fabricating a light guide panel according to the present invention comprises steps of: forming a stamper for determining patterns of the light guide panel; fixing one side of the stamper to one side of a first mold frame by using a stamper fixing part; fixing the stamper to the first mold frame by using air suction force via both air induction holes of the first mold frame formed on the surface contacting with the stamper and an air induction pipe connected with the air induction holes; assembling together the first mold frame having the stamper fixed thereto and a second mold frame; and forming the light guide panel by injecting material for the light guide panel into a space arranged between the first and second mold frames.

The distance between the border of the second mold frame and the border of the air induction hole is between 0-3 mm.

The stamper is formed to have a thickness between 0.3-1 mm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 13 is a flowchart illustrating the method for fabricating the light guide panel according to a third embodiment of the present invention.

DETAILED DESCRIPTION OF THE EMBODIMENT

Reference will now be made in detail to an embodiment of the present invention, example of which is illustrated in the accompanying drawings.

Figure 1:
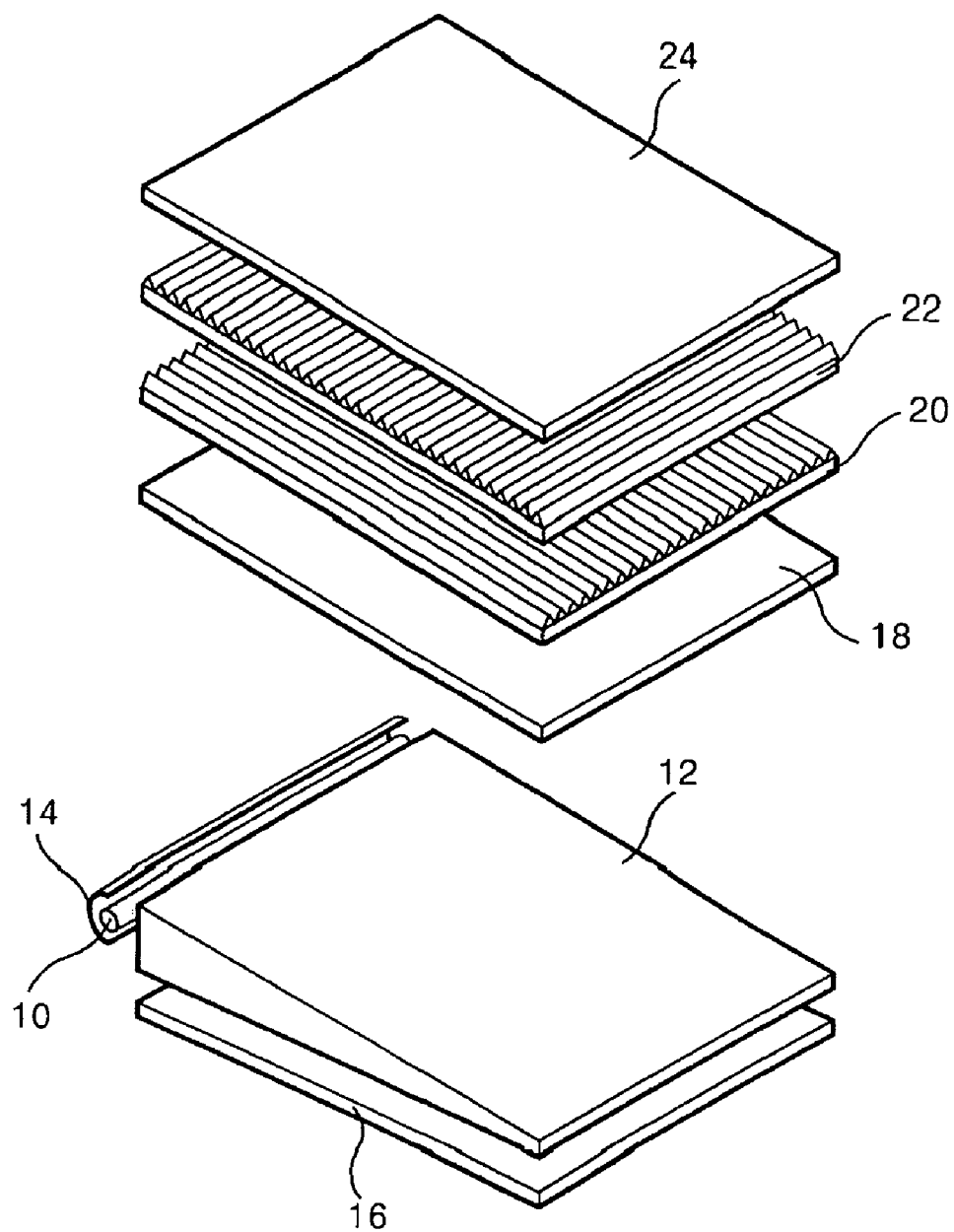
FIG. 1 is a perspective view illustrating the structure of a back light unit according to the related art.
Figure 2:
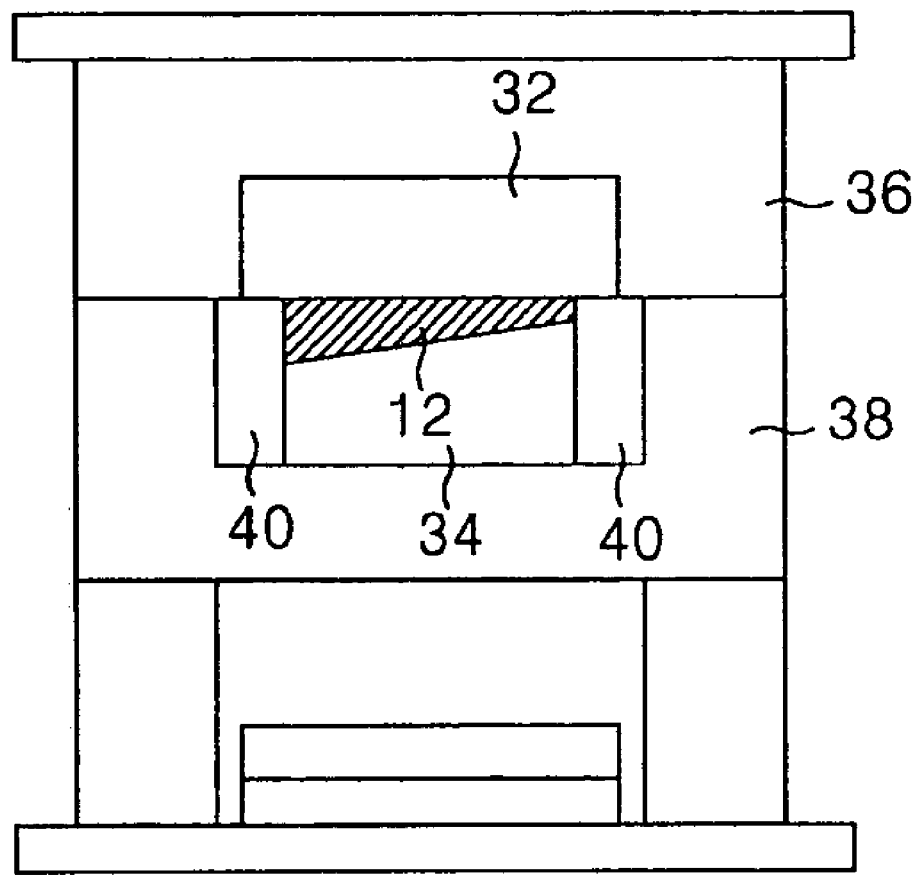
FIG. 2 is a sectional view of an apparatus for fabricating the light guide panel illustrated in FIG. 1.
Figure 3:
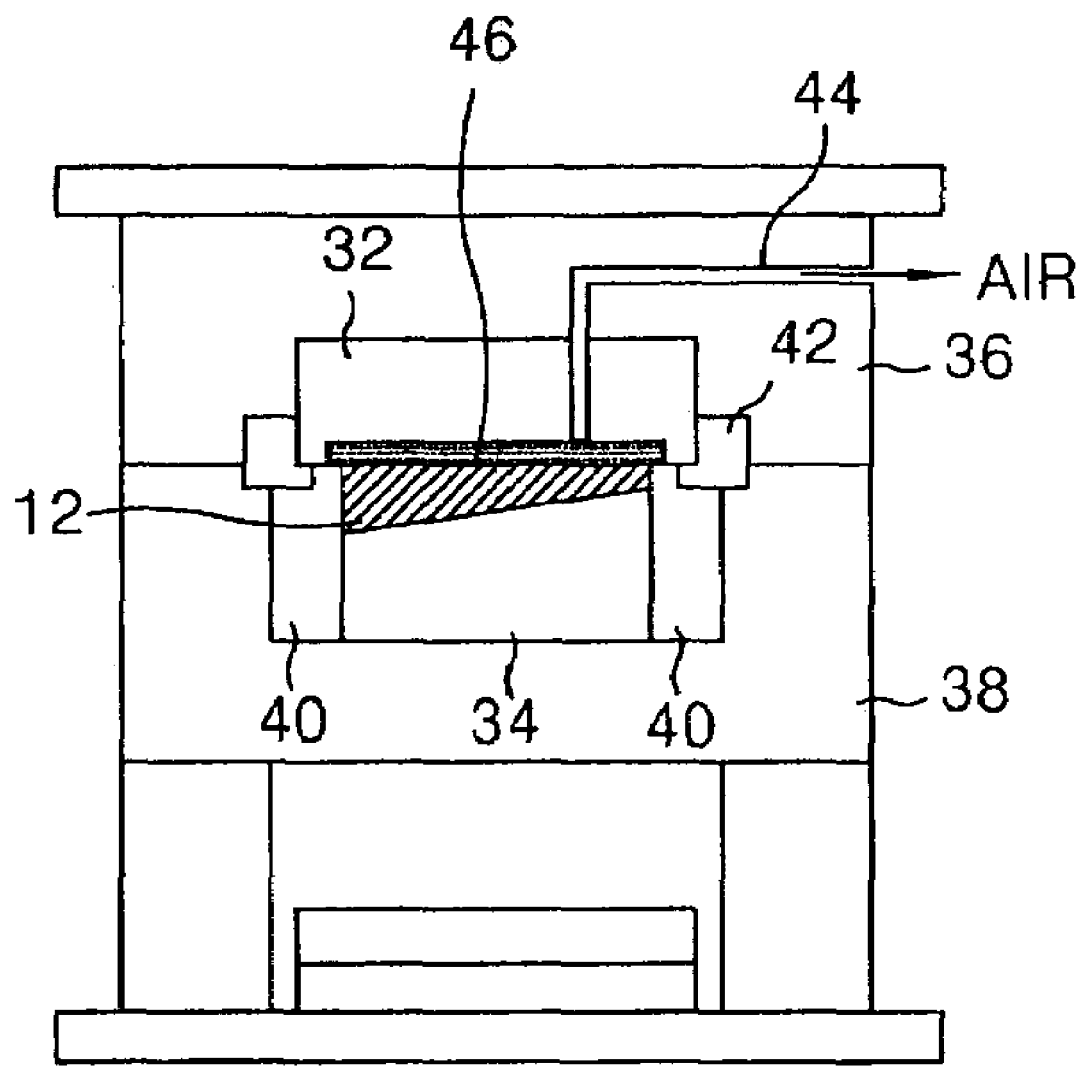
FIG. 3 is a sectional view of another apparatus for fabricating the light guide panel illustrated in FIG. 1.
Figure 4:
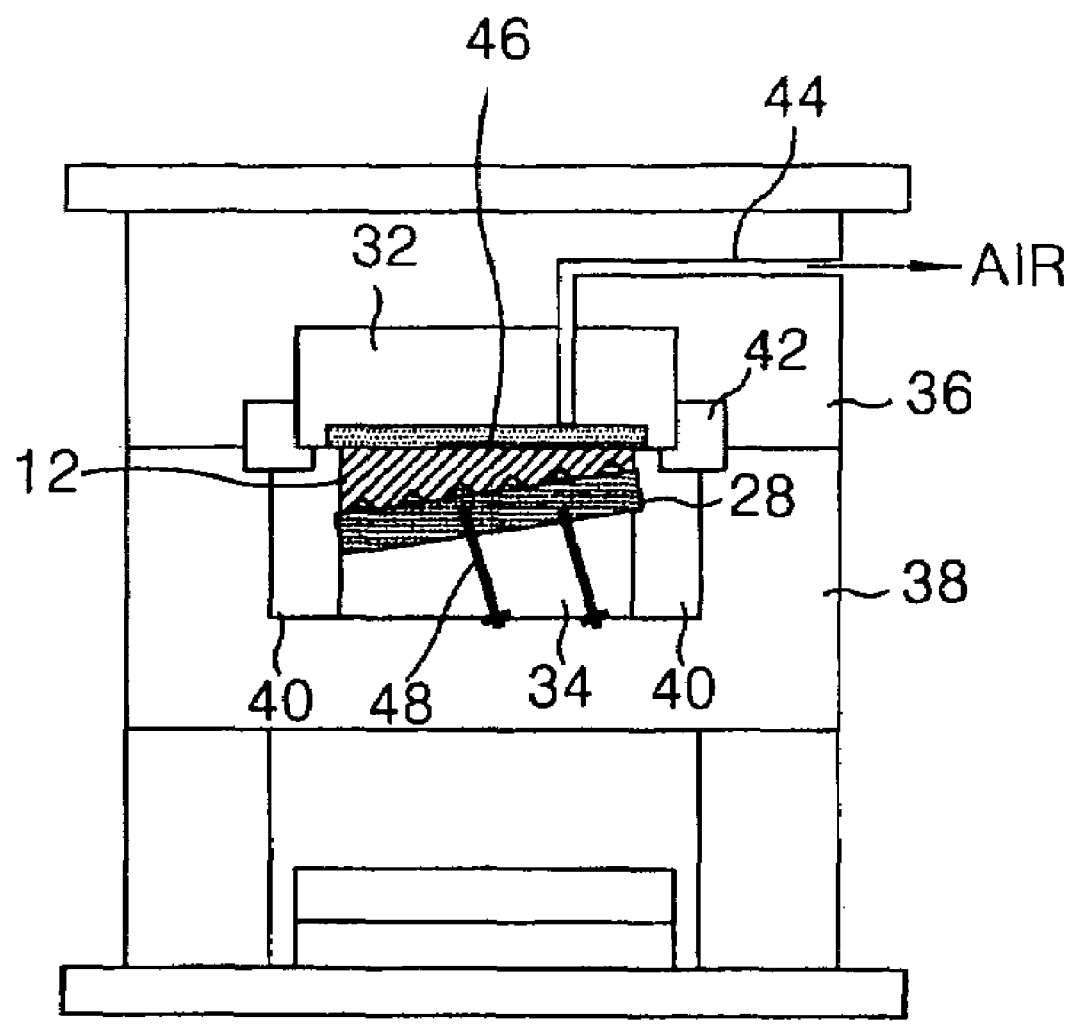
FIG. 4 is a sectional view of yet another apparatus for fabricating the light guide panel illustrated in FIG. 1.
Figure 5:
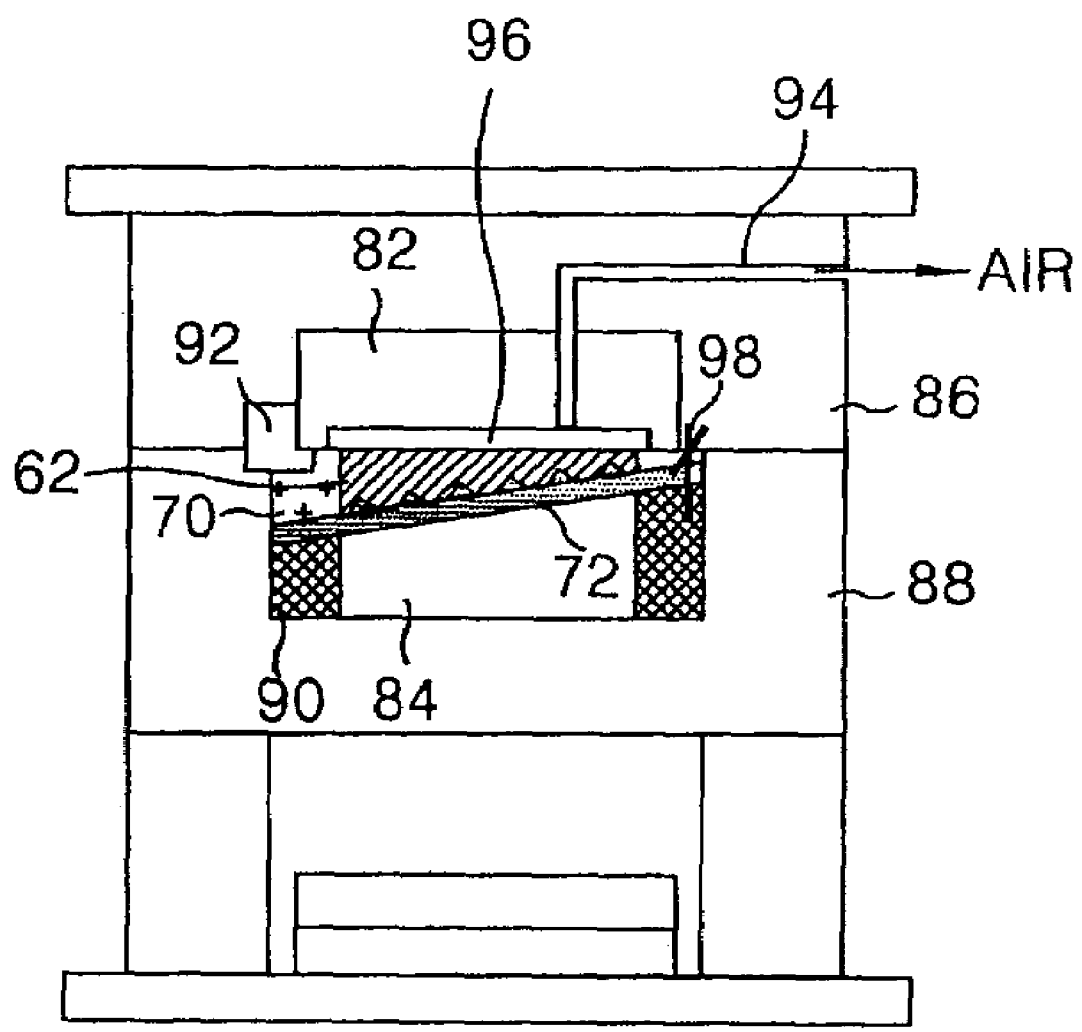
FIG. 5 is a sectional view of an apparatus for fabricating the light guide panel according to a first embodiment of the present invention.

Referring to FIG. 5, an apparatus for fabricating the light guide panel according to a first embodiment of the present invention includes: upper and lower stampers 96 and 72 for forming radiating and rear surface patterns, respectively, of the light guide plate; upper and lower mold frames 82 and 84 to which the upper and lower stampers 96 and 72 are respectively attached; side mold frames 70 and 90 formed separable so as to hold the lower stamper 72 therebetween; and first and a second fixing parts 86 and 88 for externally fixing the upper and lower mold frames 82 and 84, respectively.

The upper stamper 96 has light guiding patterns formed thereon for defining the exit surface patterns of the light guide panel. Namely, groove patterns for defining the prominent and depressed patterns on the exit surface of the light guide panel are formed on the upper stamper 96. Also, a plurality of air induction holes (not shown) connected to an air induction pipe 94 are formed on one side of the upper stamper 96 contacting with the upper mold frame 82. In other words, when the air is sucked in via the air induction pipe by an air induction device (not shown), the upper stamper 96 is attached to the upper mold frame 82 by vacuum force.

Figure 6:
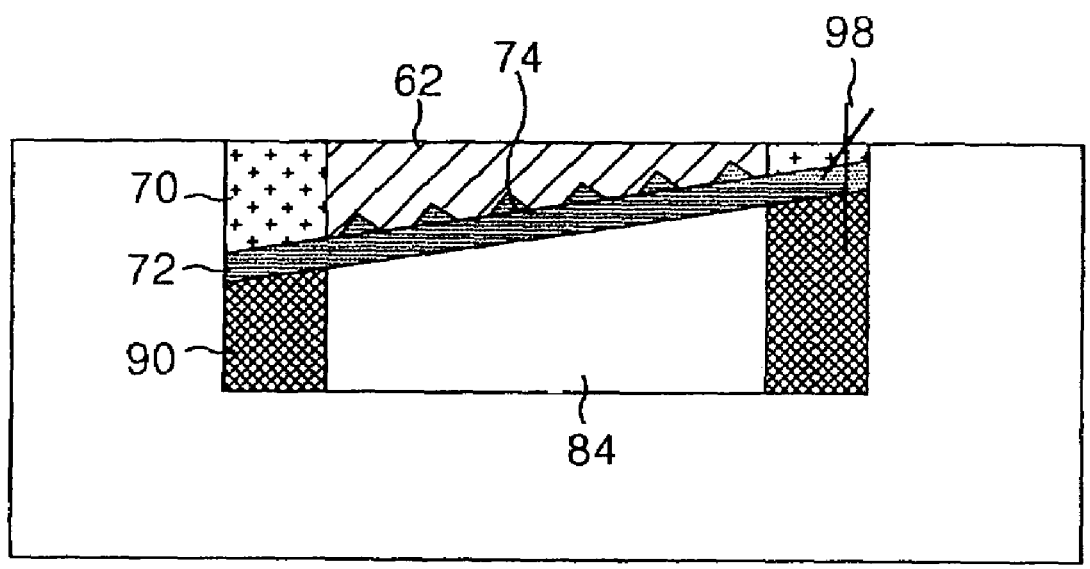
FIG. 6 is a sectional view illustrating in detail the first and the second side mold frames illustrated in FIG. 5.

Light guiding patterns for defining the rear surface patterns of the light guide panel as shown in FIG. 6 are formed on the area of the lower stamper 72 overlapping with the lower mold frame 84. The lower stamper 72 is formed slantwise at a predetermined angle, and is to be inserted between the first and second side frames 70 and 90. The width of this lower stamper 72 is greater than that of the upper stamper 96, and its thickness is between about 0.3 to about 1 mm.

The upper stamper 96 is attached to the upper mold frame 82 by the vacuum force. The lower mold frame 84 is formed so that the surface thereof contacting with the lower stamper 72 is slanted at a predetermined angle identical to that of the lower stamper 72. The lower mold frame 84 and the lower stamper 72 are combined by a screw 98.

The side frame is formed so that it can be separated into first and second side frames 70 and 90 with the lower stamper 72 interposed between them.

The screw 98 attaches the lower stamper 72 and the first and second side mold frames 70 and 90 together. Namely, a screw groove (not shown) is formed from the first side frame 70 through the lower stamper 72 to designated depth of the second side frame 90, so the screw 98 combines the first and the second mold frames 70 and 90 together by being inserted into the screw groove.

A stamper fixing piece (not shown) located at one side of the upper mold frame 82 determines the position of the upper stamper 96.

Figure 7:
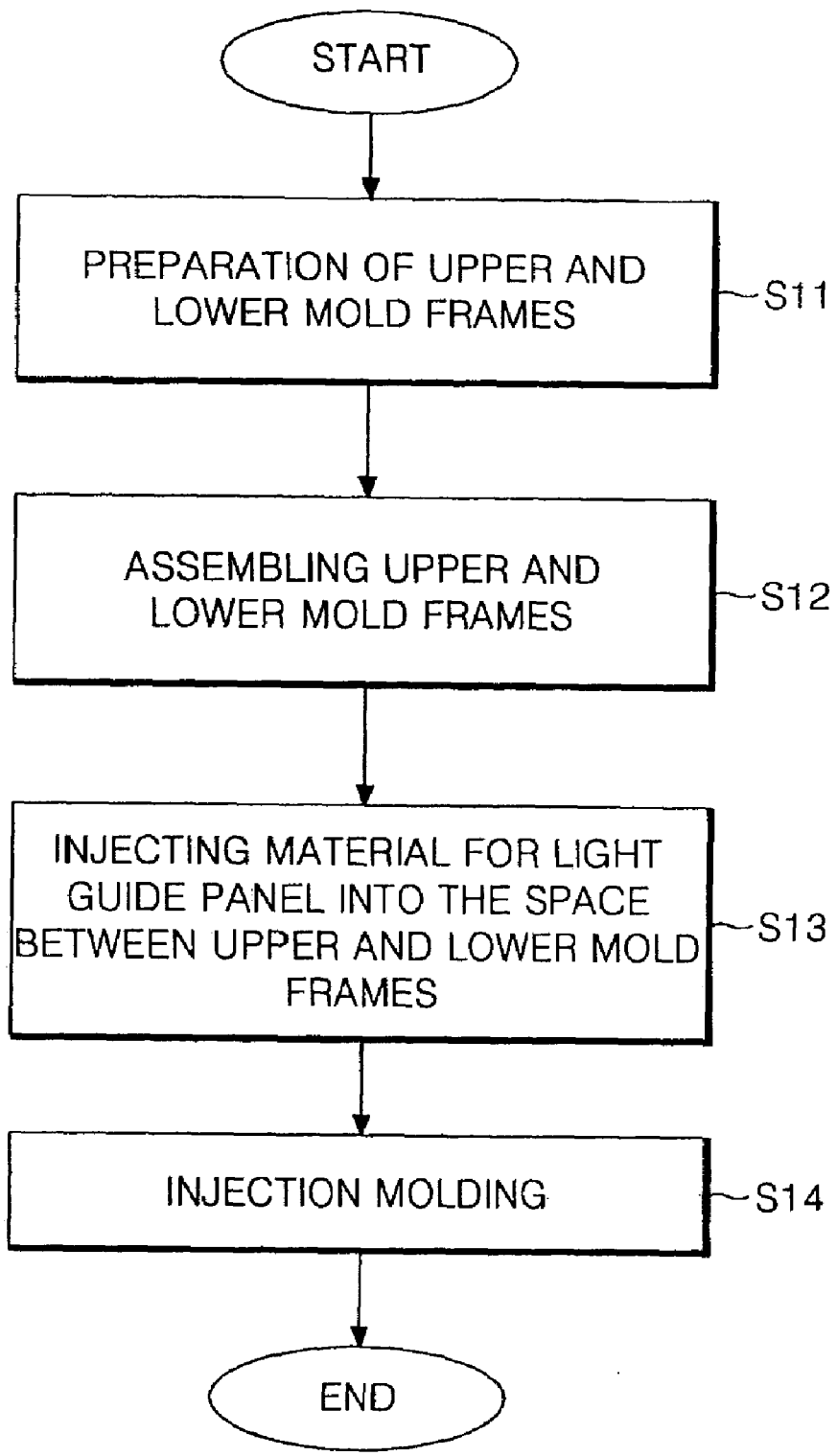
FIG. 7 is a flowchart illustrating a method for fabricating the light guide panel according to the present invention.

FIG. 7 is a flowchart illustrating a method for fabricating the light guide panel shown in FIG. 5.

Figure 8A:
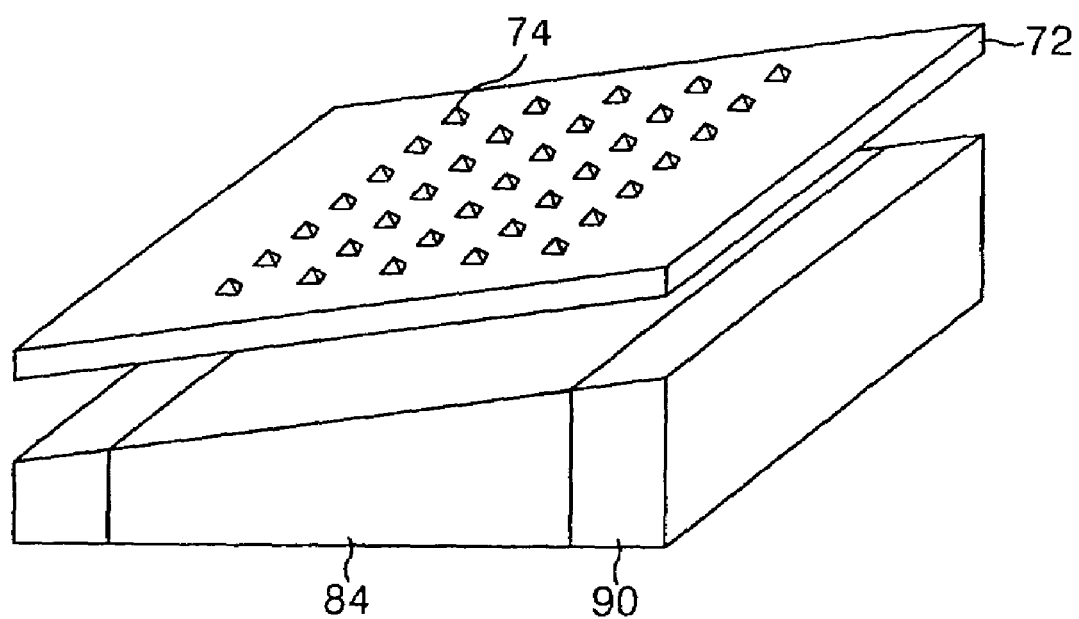
FIGS. 8a to 8d illustrates the steps of an assembling method for the first and the second side mold frames illustrated in FIG. 5, and the lower stamper.
Figure 8B:
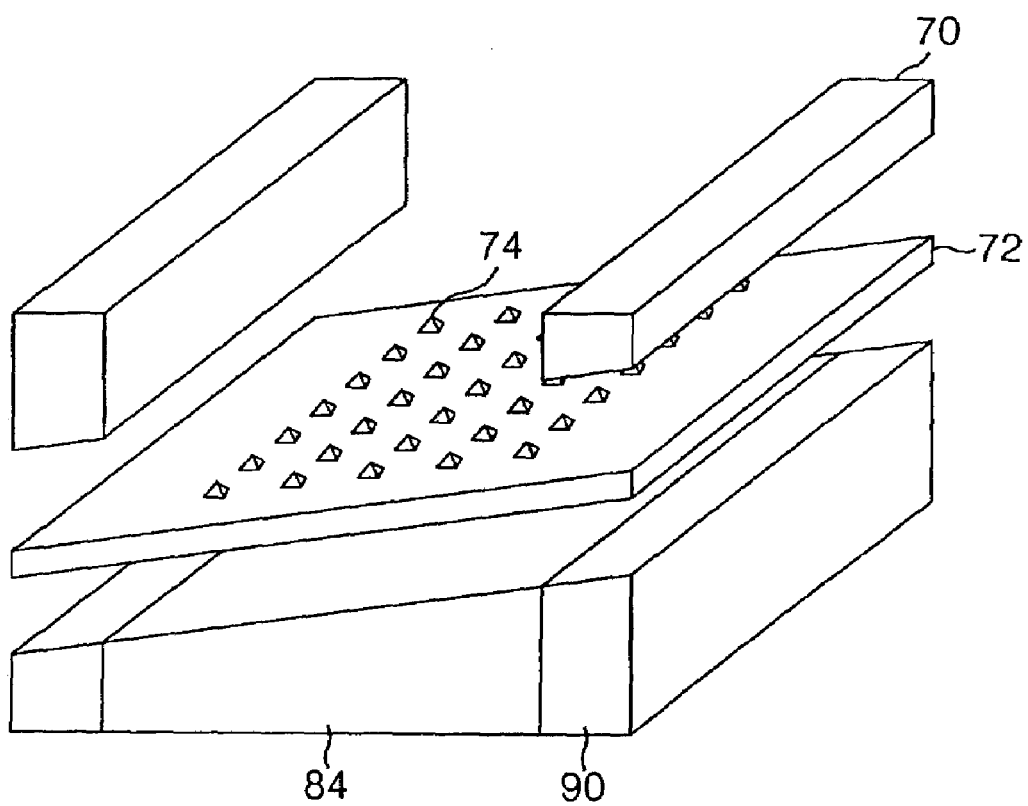
Figure 8C:
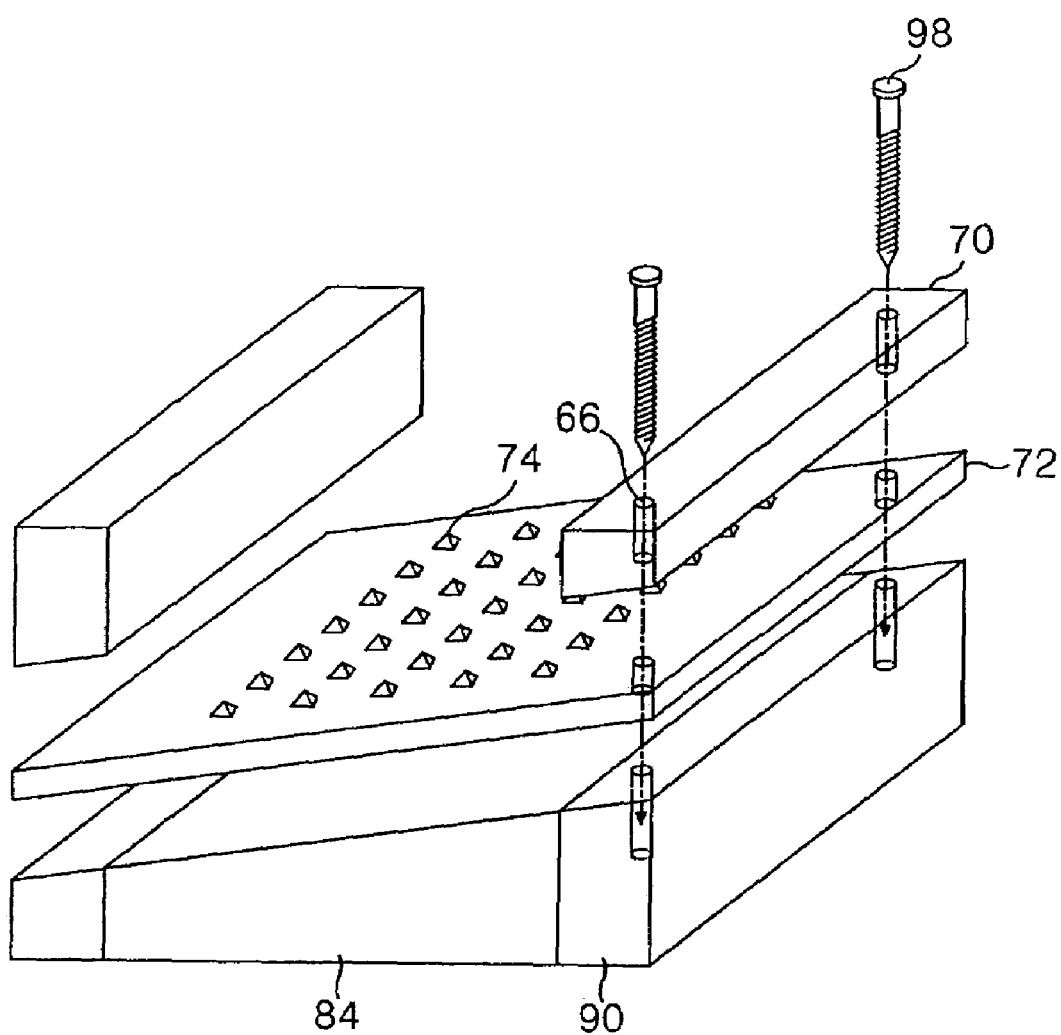
Figure 8D:
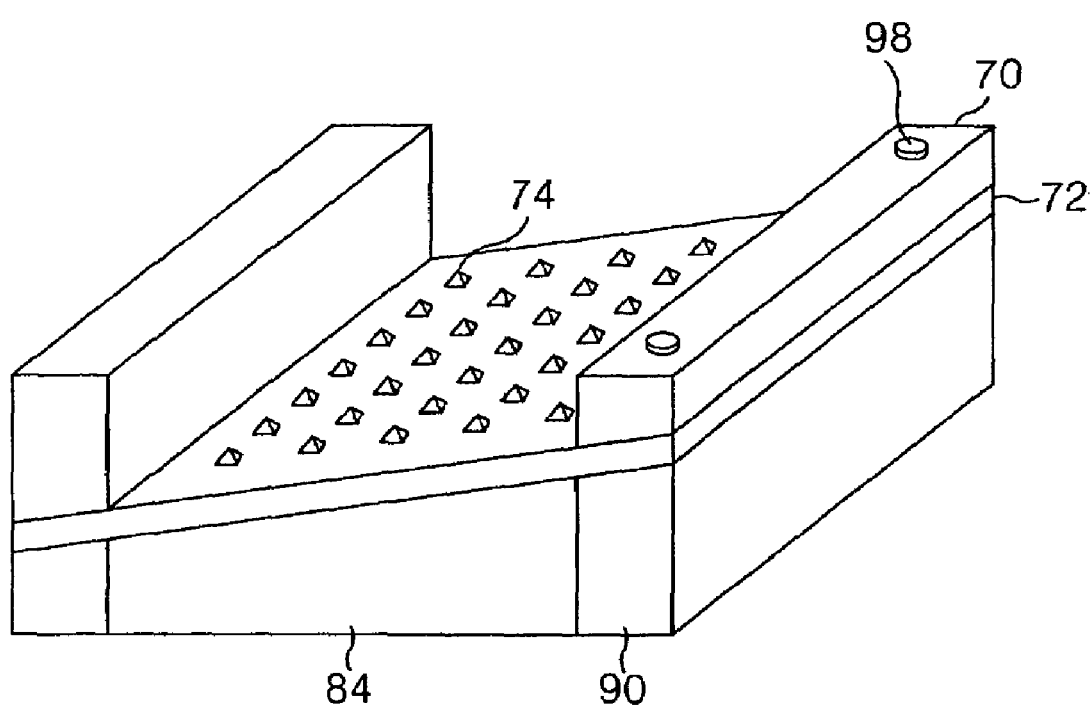

Referring to FIG. 7, first of all, the upper mold frame to which the upper stamper is attached, wherein the position of the upper stamper is determined by the stamper fixing piece, and the lower mold frame to which the lower stamper is attached are prepared (step S11). The lower stamper attached to the lower mold frame is fixed with the first and second side mold frames 70 and 90. Here, a detailed explanation will be given with reference to FIGS. 8a to 8d. After the second side and lower mold frames 90 and 84 are combined, the lower stamper having protrusion patterns is aligned on the second side and lower mold frames 90 and 84 as shown in FIG. 8a. Then, the first side mold frame 70 is aligned on the border area of the lower stamper 72 without protrusion patterns as shown in FIG. 8b. As shown in FIG. 8c, the screw groove 66 is formed through the second side mold frame 90, the lower stamper 72, and the first side mold frame 70, which are sequentially aligned. The first and second side mold frames 70 and 90, and the lower stamper 72 are connected together using the screw 98 inserted into the screw groove 66 as shown in FIG. 8d.

A space 62 corresponding to the shape of the light guide panel is provided between the upper and lower stampers through assembling together the upper mold frame having the upper stamper attached and the lower mold frame having the lower stamper attached (step S12). Material for the light guide panel is injected into the space 62 between the upper and lower stampers and hardened (step S13). Disassembling of the upper and lower mold frames leads to the ejaculation of the light guide panel (step S14).

As explained above, the apparatus and method for fabricating the light guide panel according to a first embodiment of the present invention separates the side mold frame into the first and second side mold frames, fixes the lower stamper by inserting it therebetween, and couples these together using screws. Namely, by fixing the lower stamper using the first and second side mold frames, the thickness of the lower stamper can be reduced. A thin lower stamper contributes to easy pattern formation thereon.

Figure 9:
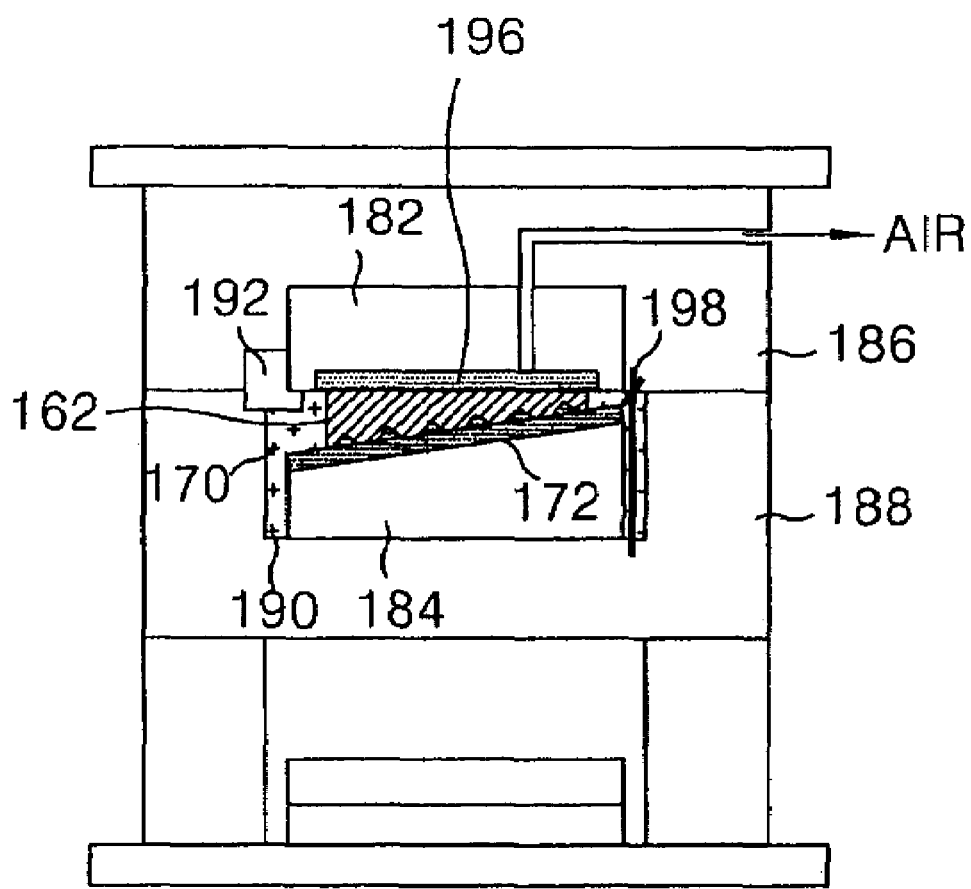
FIG. 9 is a sectional view of an apparatus for fabricating the light guide panel according to a second embodiment of the present invention.

FIG. 9 is a sectional view showing an apparatus for fabricating the light guide panel according to a second embodiment of the present invention.

The apparatus for fabricating the light guide panel according to the second embodiment of the present invention includes the same components as those of FIG. 5 except for a bent side frame which fixes the lower stamper and lower mold frame.

Figure 10:
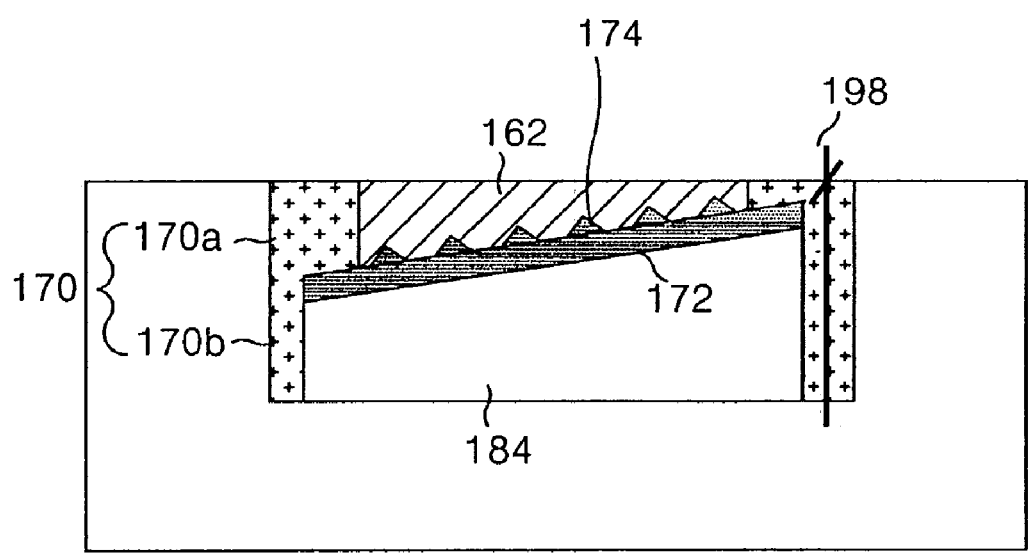
FIG. 10 is a sectional view illustrating in detail the side mold frame illustrated in FIG. 9.

The side mold frame 170 of the apparatus for fabricating the light guide panel according to the second embodiment of the present invention is formed to be bent. Referring to FIG. 10, the side mold frame 170 has a pillar part 170b contacting the lower mold frame 184, and a bent part 170a bent from the pillar part. The thickness of the bent part contacting the portion of the light guide panel close to the lamp (not shown) is less than the thickness of the bent part contacting with the portion of the light guide panel relatively far from the lamp (not shown). The lower stamper 172 having a thickness in the range of about 0.3 mm to about 1 mm is fixed using this bent part of the side mold frame 170.

A method for fabricating the light guide panel according to the second embodiment of the present invention is explained as follows. First of all, the lower stamper 172, the upper mold frame 182, the lower mold frame 184, and the side mold frame are fabricated separately. Then, the lower stamper 172 is attached to the lower mold frame 184. The lower stamper 172 is fixed by using the side mold frame having the bent part, then the side mold frame is fixed to the second fixing part 188 using screws 198. The lower mold frame 184 having the lower stamper 172 attached thereto and the upper mold frame having the upper stamper attached thereto are assembled together. Material for the light guide panel is injected into a space 162 between the upper and lower mold frames 182 and 184, and is hardened. Disassembling of the upper and lower mold frames 182 and 184 leads to the ejection of the light guide panel.

As explained above, the apparatus and method for fabricating the light guide panel according to the second embodiment of the present invention uses the side mold frame having the bent part to fix the lower stamper to the lower mold frame. So, the thickness of the lower stamper can be reduced, allowing for easy pattern formation thereon.

Figure 11:
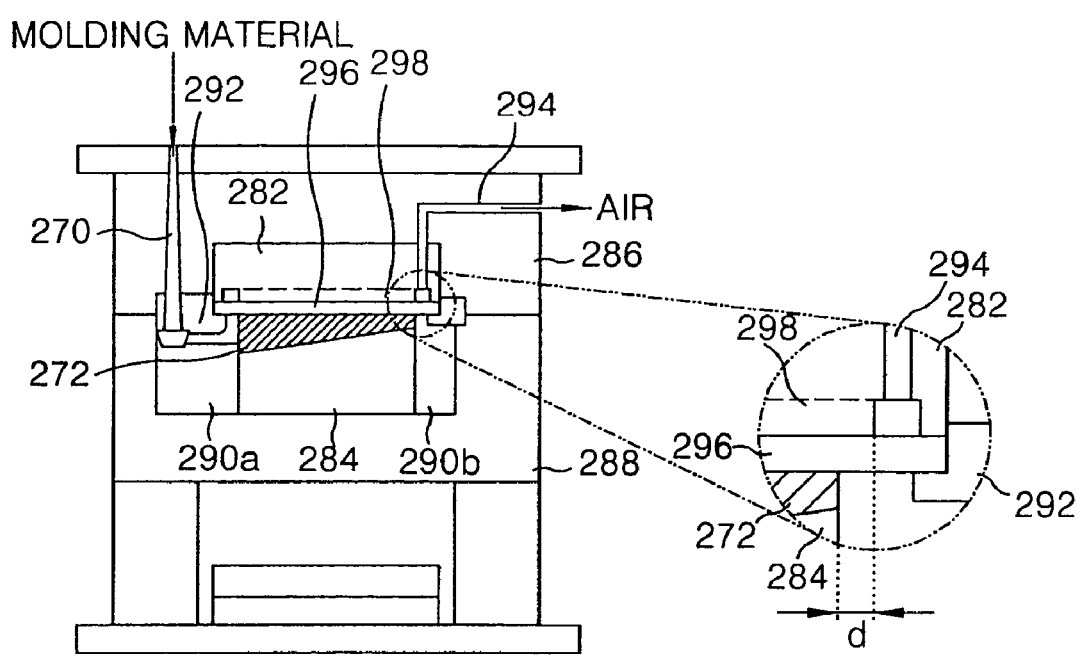
FIG. 11 is a sectional view of an apparatus for fabricating the light guide panel according to a third embodiment of the present invention.

FIG. 11 is a view showing an apparatus for fabricating the light guide panel according to the third embodiment of the present invention.

Referring to FIG. 11, the apparatus for fabricating the light guide panel according to a third embodiment of the present invention includes: an upper and lower mold frames 282 and 284; a stamper 296 attached to the upper mold frame 282 and for forming exit surface patterns of the light guide plate; air induction holes 298 for attaching the stamper 296 to the upper mold frame 282; an air induction pipe 294 connected with the air induction hole 298; a stamper fixing part for fixing at least one side of the stamper 296; an injection pipe 270 for injecting material for the light guide plate into a space arranged by the stamper 296 and the lower mold frame 284; a first and second side mold frames 290a and 290b which are formed separable so as to hold the lower mold frame 284 therebetween; and a first and a second fixing parts 286 and 288 for externally fixing the upper and lower mold frames 282 and 284 respectively.

Light guiding patterns for determining the exit surface patterns of the light guide panel are formed on the stamper 296. For instance, to form the prominent and depressed patterns, the exit surface patterns of the light guide panel, groove patterns corresponding to the prominent and depressed patterns are formed on the stamper 296. The thickness of this stamper 296 is from about 0.3 mm to about 1 mm.

Figure 12A:
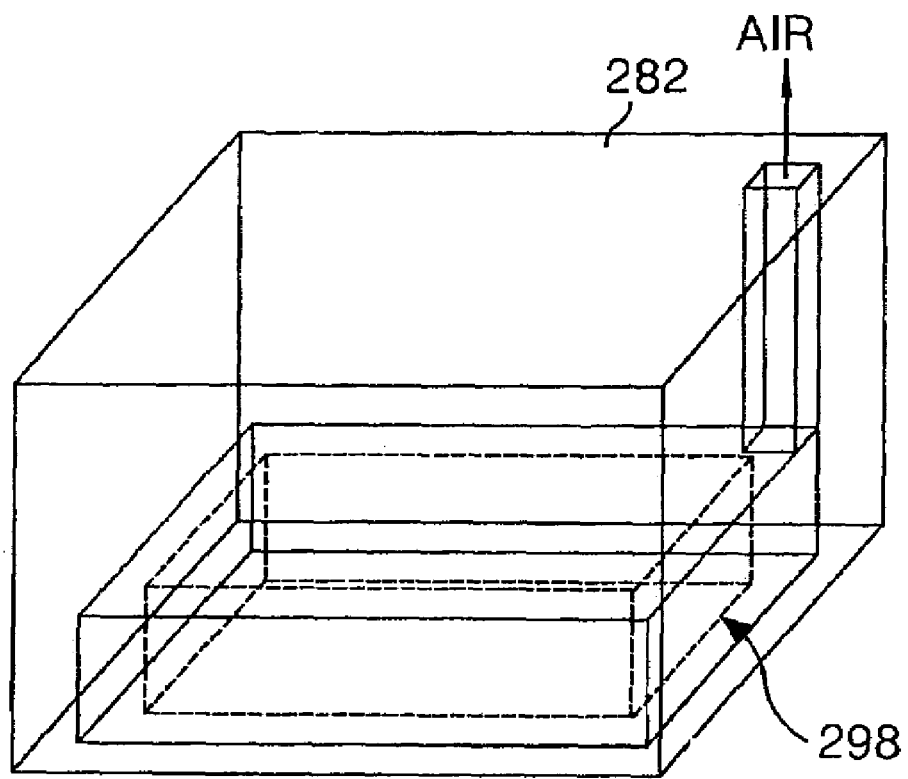
FIGS. 12a and 12b are views illustrating in detail the upper mold frame shown in FIG. 11.
Figure 12B:
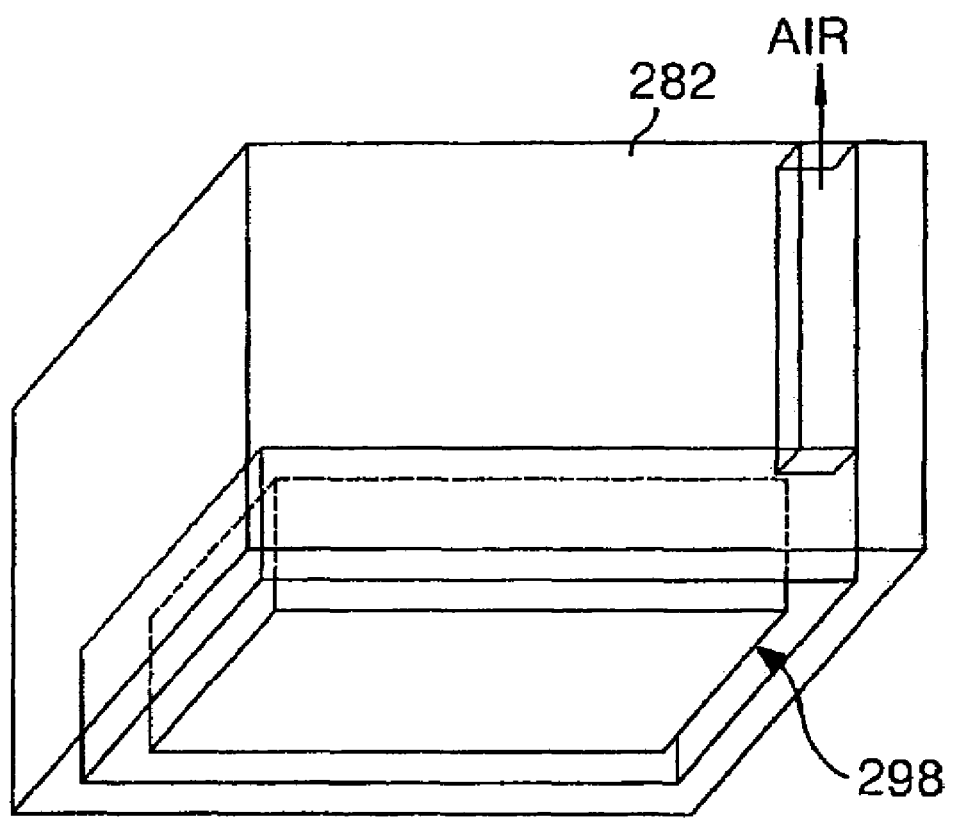

The air induction holes 298 are formed on the bottom surface of the upper mold frame 282 contacting with stamper 296 along the outline thereof as shown in FIGS. 12a and 12b. Namely, the air induction holes are formed to be the shape of polygon or circle along the stamper 296. These induction holes 298 are connected with the air induction pipe 294.

The air induction pipe 294 is formed as a through hole penetrating the upper mold frame 282 and the first fixing part 286 so as to be connected with the air induction hole 298 of the upper mold frame 282. When the air is sucked in by an air induction device (not shown) via the air induction pipe 294 and the air induction hole 298 connected with the air induction pipe 294, the stamper 296 contacting with the upper mold frame 282 having the air induction holes 298 is attached to the upper mold frame 282 by the air suction force.

The stamper fixing part 292 present at one side of the upper mold frame 282 fixes one side of the stamper 296 to one side of the upper mold frame.

The upper stamper 296 is attached to the upper mold frame 282 by the air suction force via the air induction pipe 294 and the air induction hole 298.

The lower mold frame 284 has either a separate lower stamper (not shown), having the light guiding patterns for defining the rear patterns of the light guide panel be attached thereto, or the light guiding patterns directly formed thereon. This lower mold frame 284 is formed so as to have the same width as the light guide panel. The distance between the border of the lower mold 284 and the border of the air induction hole 298 is formed to be of range of about 0 to about 3 mm. Namely, the width of one side of the air induction hole 298 present at the lower region of the upper mold frame 282 is greater than or equal to that of one side of the lower mold frame 284. The reason of this can be explained as follows. During the injection molding process the material for the light guide panel, injected into the space between the stamper 296 and the lower mold frame 284 by high ejaculation pressure, expands. If the width of one side of the air induction hole 298 is smaller than that of one side of the lower mold frame 284, the resulting light guide panel will have bulges at the areas where the air induction holes 298 do not overlap with the lower mold frame 284.

The first and second side mold frames 290*a* and 290*b* are formed as separate so as to hold the lower mold frame 284 therebetween. A conduit where the material for the light guide panel can flow is formed between the first side mold frame 290*a* and the stamper fixing part 292, and the second side mold frame 290*b* is formed to face one side of the light guide panel.

The injection pipe is formed to penetrate the first fixing part 286 and the stamper fixing part 292. The forming material, the material for the light guide panel for example polymethylmethacrylate (PMMA), is injected into the space 272 arranged between the stamper 296 and the lower mold frame 284 via the injection pipe.

FIG. 13 is a flowchart illustrating the steps of a method for fabricating the light guide panel shown in FIG. 11.

First of all, the stamper having the light guiding patterns imprinted thereon is separately fabricated (step S21). This stamper 296 is fixed to the side of the upper mold frame 282 using the stamper fixing part 292 (step S22). The stamper 296 fixed to the side of the upper mold frame 282 is firmly attached to the upper mold frame 282 by vacuum force via the air induction hole 298 and the air induction pipe 294 (step S23). Through assembling this upper mold frame 282 and the separately formed lower mold frame 284, a space 272 corresponding to the shape of the light guide panel is provided between the stamper 296 and the lower mold frame 284 (step S24). Material for the light guide panel is injected into the space 272 via the injection pipe penetrating both the upper mold frame 282 and the stamper fixing part 292, and hardened (step S25). Disassembling of the upper and lower mold frames 282 and 284 leads to the ejection of the light guide panel (step S26).

Accordingly, in the apparatus and method for fabricating the light guide panel according to the third embodiment of the present invention, the stamper is attached to the upper mold frame by the air suction force via the air induction pipe and the air induction holes. Namely, the stamper is firmly fixed to the upper mold frame using the air induction pipe and the air induction holes.

As explained above, the apparatus and method for fabricating the light guide panel according to the present invention fix the lower stamper to the lower mold frame. So, the thickness of the lower stamper can be reduced. Also, the stamper is attached to the upper mold frame by vacuum force via the air induction pipe and the air induction holes. The stamper, having patterns corresponding to the patterns of the light guide panel, can be stably fixed to the upper mold frame using both the air induction pipe and the air induction holes connected together. In addition, the apparatus and method for fabricating the light guide panel according to the present invention can fabricate a light guide panel having patterns on both surfaces thereof, and so can enhance the performance of transmission and distribution of lights.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for fabricating a light guide panel, comprising:
   a stamper having a pattern thereon for forming the patterns of the light guide panel;
   separate first and second side mold frames holding the stamper therebetween;
   a screw groove penetrating the first side mold frame, the stamper, and a portion of the second side mold frame;
   a screw inserted to the screw groove to couple the first side mold frame, the stamper, and the second side mold frame.

2. The apparatus for fabricating a light guide panel according to claim 1, further comprising:
   a first mold frame placed between the first and second side mold frames and to which the stamper is to be attached;
   a first fixing part externally fixing the first mold frame, and the first and second side mold frames;
   a second stamper having a pattern there on for forming patterns on the exit surface of the light guide panel;
   a second mold frame to which the second stamper is attached; and
   a second fixing part fixing the second mold frame.

3. The apparatus for fabricating a light guide panel according to claim 2, wherein the stamper has a thickness of about 0.3 mm to about 1 mm.

4. The apparatus for fabricating a light guide panel according to claim 2, wherein the stamper has light guiding patterns for defining the rear surface patterns of the light guide panel.

5. The apparatus for fabricating a light guide panel according to claim 4, wherein the light guiding patterns are formed so as to overlap with the first mold frame.

6. The apparatus for fabricating a light guide panel according to claim 2, wherein the second stamper is attached to the second mold frame by an air induction pipe.

* * * * *